2,872,381

MICROBIOLOGICAL OXIDATION OF STEROIDS

Josef Fried, New Brunswick, David Perlman, Princeton, and Asger F. Langlykke, Highland Park, N. J., and Elwood O. Titus, Silver Spring, Md.

No Drawing. Original application August 31, 1954, Serial No. 453,411. Divided and this application August 13, 1958, Serial No. 758,640

6 Claims. (Cl. 195—51)

This application is a division of Serial No. 453,411, filed August 31, 1954, now abandoned, which in turn is a continuation-in-part of Serial No. 239,018, filed July 27, 1951, and now Patent No. 2,709,705, granted May 31, 1955.

This invention relates to, and has for its object the improvement of a method of producing medicinal agents (or intermediates for medicinal agents) from steroids by microbiological action.

Prior to this invention, attempts had been made to convert steroids into medically-useful substances by utilizing the activity of growing microorganisms, but with generally unsatisfactory results from the standpoints of utility of the substance produced and/or efficiency of its production. Thus, the prior attempts resulted either in oxidation of hydroxy groups to keto groups (as in the conversion of dehydroepiandrosterone to androstenedione) or rupture of the steriod nucleus, rather than the desired addition of oxygen to the steriod nucleus.

It has been found that steroids having a methylene group in the 16-position, especially 3-keto or 3-hydroxy steroids, or protected derivatives thereof, either of the androstane (including etiocholane and androstene) series or pregnane (including allopregnane and pregnene) series, the 3,20-diketo steroids of the pregnane series being particularly preferred, can be converted into useful 16α-hydroxy derivatives by subjecting them to the action of enzymes of special microorganisms or to the action of the organisms themselves under oxidizing and preferably aerobic conditions.

It has further been discovered that the 16α-hydroxy derivatives, thus formed, which are in many instances themselves new compounds, are useful as starting materials in new processes for preparing both known and new steroid derivatives. Aside from their use as intermediates as disclosed in Serial No. 239,018, all the 16α-hydroxy steroids produced by the method of this invention may be oxidized to the corresponding useful 16-keto derivatives, as disclosed in the application of Herz et al., Serial No. 453,433 filed August 31, 1954. 16α-hydroxy-progesterone is further useful as a starting material in the preparation of the known steroids: allopregnane-3,6,20-trione and pregnane-3,11,20-trione. 16α-hydroxy-11-desoxycorticosterone is a useful starting material in the preparation of $\Delta^4$-androstene-3,16-dione, a new steroid which is a protein anabolic agent, as disclosed in said Serial No. 453,433. The 16α-hydroxy-$\Delta^4$-androstene-3,17-dione and 16α-hydroxytestosterone formed by the instant process are new steroids which have androgenic activity; the former further useful as a starting material in the production of $\Delta^4$-3-ketoetiobilienic acid dimethyl ester which is a new steroid derivative.

Among the steroids which may be oxidized by the practice of this invention are those steroids unsubstituted in the 16-position, which are members of: the androstane series, which series includes the androstene and etiocholane series; and the pregnane series, which series includes the pregnene and allopregnane series. Of these, the steroids of the pregnane series and more particularly the 3,20-diketo steroids of the pregnane series are preferred. Examples of suitable steroids of the pregnane series include progesterone; pregnenolone; pregnanolone; hydroxylated progesterone, such as 2α, 6α, 6β, 7, 8, 9, 11α, 11β, 12α, 14, 15α, and 15β-hydroxyprogesterone; halogenated progesterone, such as 21-chloroprogesterone; aldosterone; corticosterone; 11-desoxycorticosterone; 17α-hydroxy-11-desoxycorticosterone (Reichstein's Compound S); hydrocortisone (Compound F); and the esters thereof; particularly the carboxylic acid esters such as the fatty acid esters (e. g. acetate, propionate, and butyrate) and the aromatic acid esters (e. g. benzoate and naphthoate). As indicated before, however, although the preferred starting materials are steroids of the pregnane series, the process of this invention is a general one which may be employed to 16α-hydroxylate other classes of steroids such as those of the androstane series as exemplified by $\Delta^4$-androstene-3,17-dione and testosterone.

Among the steroids formed by the process of this invention are the 16α-hydroxy derivatives of the pregnane series, preferably of the 16α-hydroxy-3,20-diketo-steroids of the pregnane series. Examples of resulting products of the 16α-hydroxy pregnane series include 16α-hydroxyprogesterone; the 16α-hydroxy derivatives of hydroxylated progesterone; the 16α-hydroxy derivatives of halogenated progesterone; 16α-hydroxy- aldosterone; 16α-hydroxycorticosterone; 16α - hydroxy - 11-desoxycorticosterone; 16α,17α-dihydroxy-11-desoxycorticosterone; 16α-hydroxy - hydro - cortisone; and the esters thereof. If a steroid of the androstane series is hydroxylated, the 16α-hydroxy derivative is also formed as exemplified by 16α-hydroxy-$\Delta^4$-androstene-3,17-dione and 16α-hydroxytestosterone.

As before stated, the preferred final products are the 16α-hydroxy-3,20-diketo derivatives of the pregnane series which may be represented by the following general formula:

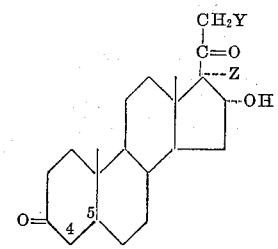

wherein the 4,5-position is double-bonded or saturated (the 4,5-double-bonded steroids are preferred), and wherein Z is hydrogen or α-hydroxy; and Y is hydrogen, hydroxy, halogen, or RO, wherein R is an acyl radical such as a fatty acid radical (e. g. acetyl, propionyl, benzoyl, and naphthoyl) or a hydrocarbon radical, such as an alkyl radical (e. g. methyl, ethyl, and butyl) or an aralkyl radical (e. g. benzyl and phenethyl).

The microorganisms useful for this process include certain molds. Among the molds useful in this process are certain members of the class Fungi Imperfecti, as exemplified by *Pestalotia funerea* (obtainable from the Kansas State College Department of Botany).

The action of the enzymes of these microorganisms to produce useful derivatives of steroids can be utilized either by including the steroid in an aerobic culture of the microorganism, or by bringing together, in an aqueous medium, the steroid, air, and enzymes of non-proliferating cells of the microorganism. Thus, for example, when supplemented with progesterone, a culture of the microganism forms the useful 16α-hydroxy derivative thereof as disclosed in Patent No. 2,709,705. Similarly, the action of the organisms on desoxycorticosterone yields the 16α-hydroxy derivative.

In general, the conditions of culturing the molds for the purposes of this invention are (except for the inclusion of the steroid to be converted) the same as those of culturing various other molds for the production of antibiotics and/or vitamin $B_{12}$, i. e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate and/or the steroid itself. Preferably however, the medium includes an assimilable source of carbon and energy in addition to the steroid; and preferably also, this source is at least in substantial part a member of the group consisting of (1) fatty acids having at least 14 carbon atoms and (2) fats. Use of such lipid source of carbon and energy (especially use of a fatty oil) is advantageous in that it enhances the availability of the steroid for conversion.

The nitrogen source materials may be organic (e. g. soybean meal, cornsteep liquor, meat extract, and/or distillers' solubles) or synthetic (i. e. composed of simple, synthesizable organic or inorganic compounds such as ammonium salts, alkali nitrates, amino acids, urea or thiourea).

As to the energy source material, lipids, especially (1) fatty acids having at least 14 carbon atoms, (2) fats or (3) mixtures thereof, are preferred. Examples of such fats are lard oil, soybean oil, linseed oil, cottonseed oil, peanut oil, fancy mutton tallow, sperm oil, olive oil, tristearin, tripalmitin, triolein and trilaurein; and illustrative fatty acids include stearic, palmitic, oleic, linoleic and myristic acids.

Other carbon-containing materials may also be used. For example, such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The media may contain other precursors in addition to the steroids to obtain other valuable products. For example, an assimilable source of cobalt may be included where a vitamin $B_{12}$ is desired, and the by-product then recovered by conventional methods.

The following examples are illustrative of the invention:

EXAMPLE 1

*Conversion of progesterone to 16α-hydroxyprogesterone by fermentation with* Pestalotia funerea An aqueous medium of the following composition is prepared:

| | |
|---|---|
| Glucose _____ g__ | 10 |
| Cornsteep liquor solids_____ g__ | 3.0 |
| $NH_4H_2PO_4$ _____ g__ | 3.0 |
| $CaCO_3$ _____ g__ | 2.5 |
| Yeast extract_____ g__ | 2.5 |
| Soybean oil_____ g__ | 2.2 |
| Progesterone _____ g__ | 0.5 |
| Water _____ liter__ | 1 |

The pH of the medium is adjusted to 7.0±0.1. 100 ml. portions of the medium are distributed in 500 ml. Erlenmeyer flasks. The flasks are plugged with cotton and sterilized in the usual manner (by autoclaving). When cool, each of the flasks is inoculated with 5–10% of a vegetative inoculum of *Pestalotia funerea*. The flasks are maintained at about 25° C. and mechanically shaken.

After three days of fermentation, the contents of six flasks are pooled and filtered to remove mycelium. The filtered broth is extracted with four 300 ml. portions of chloroform. The solvent is removed in vacuo. 300 mg. of progesterone gives 160 mg. of steroids and lipids. On crystallization from acetone a total of 80 mg. of 16α-hydroxyprogesterone, M. P. 224–225° C., $[\alpha]_D$ +126° C. (c., 0.40 in chloroform) is obtained. The product was identified by infrared comparison with an authentic sample.

EXAMPLE 2

*Conversion of testosterone to 16α-hydroxytestosterone by fermentation with* Pestalotia funerea The fermentation conditions are as described in Example 1. 160 mg. of testosterone yields 92 mg. of crude steroids. Chromatography of this material on 1.84 grams of acid-washed alumina furnishes from the benzene-chloroform (1:1) (150 ml.) and chloroform (200 ml.) eluates, about 32.4 mg. of amorphous material which is followed by a crystalline fraction (about 26 mg.) eluted with 10% acetone in chloroform (400 ml.). The recrystallization of this fraction from acetone-hexane furnishes 16α-hydroxytestosterone, M. P. 183–184° C., $[\alpha]_D^{23}$ +76° (c., 0.59 in chloroform), identical in all respects with the material obtained by fermentation of 16α-hydroxyprogesterone with *Streptomyces lavendulae* (U. S. Patent No. 2,756,179, granted July 24, 1956).

Continued elution of the column with 5% methanol in acetone (300 ml.) yields a second crystalline fraction (about 12 mg.), which after recrystallization from ethanol melts at about 279–286° C. This latter substance probably represents a dihydroxytestosterone.

Other media than those disclosed in the foregoing examples may be used for the purpose of this invention, the only requirement being of course that they be media which support the oxidizing growth of molds. An adequate (sterile) air supply should be maintained during the fermentation, which may be done in the conventional manner of conducting oxidizing fermentations, e. g., by exposure of a large surface of the medium to air or by submerged aerated culture. The incubation time may determine the degree of oxidation. Thus, pregnenolone appears to be oxidized first to progesterone and on further incubation the latter is converted to 16α-hydroxyprogesterone. The incubation may of course be stopped at a time when the medium contains the highest titer of progesterone, if that is the desired product.

The invention may be variously otherwise embodied within the scope of the appended claims.

We claim:

1. The method of converting a steroid into a 16α-hydroxy derivative thereof, which comprises subjecting a steroid selected from the group consisting of a steroid of the pregnane series and a steroid of the androstane series to the action of enzymes of *Pestalotia funerea*, under oxidizing conditions, and recovering the 16α-hydroxy steroid formed.

2. The method of claim 1 wherein the steroid is of the pregnane series.

3. The method of claim 1 wherein the steroid is of the androstane series.

4. The method of claim 1 wherein the steroid is a 3-keto-steroid.

5. The method of claim 1 wherein the steroid is progesterone.

6. The method of claim 1 wherein the steroid is testosterone.

References Cited in the file of this patent

UNITED STATES PATENTS 2,721,163     Shull et al. _____ Oct. 18, 1955